United States Patent

[11] 3,608,052

| [72] | Inventor | Kenneth M. Gunn<br>Chesterfield, Va. |
|---|---|---|
| [21] | Appl. No. | 10,064 |
| [22] | Filed | Feb. 12, 1970 |
| [45] | Patented | Sept. 21, 1971 |
| [73] | Assignee | Texaco, Inc.<br>New York, N.Y.<br>Continuation of application Ser. No.<br>660,781, Aug. 15, 1969, now abandoned. |

[54] METHOD FOR FABRICATING FIBER REINFORCED ARTICLES
8 Claims, 4 Drawing Figs.

[52] U.S. Cl. .................................................. 264/295,
264/137, 264/263, 264/317
[51] Int. Cl. ........................................................B29c 15/00,
B29d 3/02, B29g 7/00
[50] Field of Search............................................ 264/313,
316, 324, 291–292, 275, 136, 137, 1, 258, 263,
295

[56] References Cited
UNITED STATES PATENTS

| 2,414,226 | 1/1947 | Everett.......................... | 264/317 X |
| 2,782,458 | 2/1957 | Emmert.......................... | 264/316 X |
| 3,155,477 | 11/1964 | Swarts........................... | 264/317 X |
| 3,253,896 | 5/1966 | Woodcock..................... | 264/1 |
| 3,492,392 | 1/1970 | Kasamatsu..................... | 264/257 |

FOREIGN PATENTS

| 379,330 | 1962 | Japan.......................... | 264/313 |

*Primary Examiner*—Robert F. White
*Assistant Examiner*—Richard R. Kucia
*Attorney*—Stowell & Stowell

ABSTRACT: A method for fabricating fiber reinforced articles. A plurality of elongated fibers are formed into a bundle and impregnated with a resin matrix material. The impregnated bundle is encapsulated in a resilient tube and longitudinal tension is applied to the tube to align and consolidate the fibers in the bundle while the resin cures, after which the tube is removed from the bundle.

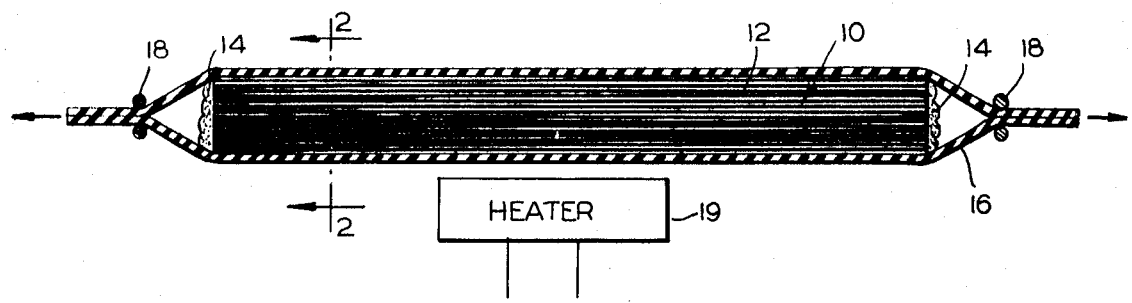
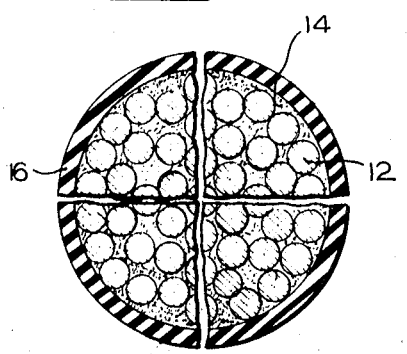
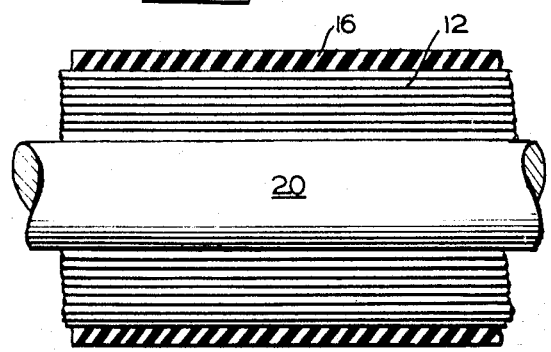
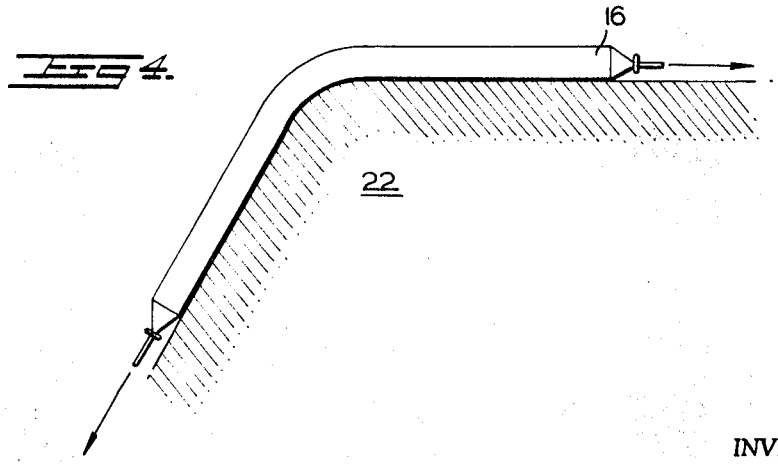

3,608,052

METHOD FOR FABRICATING FIBER REINFORCED ARTICLES

This is a continuation of application No. 660,781 filed Aug. 15, 1969, now abandoned.

BACKGROUND OF THE INVENTION

This invention related generally to formation of plastic and nonmetallic articles and more particularly to a method for fabricating elongated, fiber reinforced articles.

This invention finds particular utility in the formation of elongated fiber reinforced articles such, for example, as rods, tubes, and structures formed by impregnating a fiber bundle with a binder. It is common in the prior art to form such articles by impregnating the bundle with a resin followed by application of radial compression thereto, simultaneously curing the resin to produce the finished articles, The art of forming articles by this process is particularly difficult since voids are readily incorporated in the resultant structure. Such voids result in the reduction of strength and inconsistency of properties in the produced articles. In order to eliminate such voids, it is necessary to carefully fabricate the articles and utilize consistent, equally applied pressure over the extent thereof during the curing process. In order to achieve uniform results, it has been necessary in the prior art to provide expensive, relatively complicated die apparatus for this purpose.

SUMMARY OF THE INVENTION

This invention avoids the disadvantages of the prior art by providing a novel method and apparatus for fabricating fiber reinforced articles simply and inexpensively. This is achieved by providing a tubular, resilient, mold which encapsulates the resin impregnated fiber bundle prior to curing. The required pressure is applied to the bundle during curing, by longitudinally tensioning the resilient tube, thereby reducing the diameter thereof to radially compress the bundle contained therein.

This invention also provides a method for further formation of the bundle by deformation of the bundle containing tube to a desired configuration prior to final curing of the resin.

The other aspects and fields of utilization of the invention will appear more clear from the following description of the principles of the invention and illustrative embodiments thereof with particular reference to the accompanying drawings in which:

BRIEF DESCRIPTION OF THE DRAWINGS

FIG. 1 is an elevational view in section of a fiber article disposed in a mold in accordance with the invention;

FIG. 2 is an enlarged transverse sectional view of FIG. 1 taken along the lines 2—2 thereof;

FIG. 3 is an enlarged fragmentary sectional view similar to FIG. 1 showing a variation in accordance with the invention; and FIG. 4 is an elevational view illustrating a further step in accordance with the invention.

Referring now particularly to FIGS. 1 and 2 of the drawings, a bundle indicated generally at 10, comprising elongated, aligned fibers 12 impregnated with resin 14, is disposed in an elastic tube or sheath 16. The fibers are illustrated in the figures somewhat enlarged for purposes of clarity of description.

The fibers 12 may be of any material compatible with the use to which the article is to be applied such, for example, as glass, carbon yarn or the like or a composite such, for example, as silicon carbide on a tungsten substrate or boron on a tungsten substrate. The resin 14, consistent with the intended use of the article being fabricated and compatible with the composition of the fibers 12, may comprise any resin which has suitable impregnating characteristics as a liquid and provides the required binding in its solidified state. The term resin, as used herein, is intended generically and includes any binder material such, for example, as epoxy resins, phenolic resins, silicone resins, polymides, polyamides and polyesters.

The tube 16 is fabricated from a suitable resilient material such, for example, as gum latex rubber or the like. Other elastomers, such, for example, as neoprene or silicone rubber can be used if high processing temperatures are involved as will be described in greater detail below.

The tube 16 is greater in length than the bundle 10 so that the ends thereof extend beyond the ends of the bundle. Clamps 18 are provided around the ends of the tube to furnish means to apply tension to the tube as will be described in greater detail below.

In formation of the bundle 10, fibers 14 are cut to length and gathered in a bundle of desired cross-sectional dimension. The bundle is then tied or cemented at at least one end thereof and impregnated with the resin to form a matrix therebetween.

A heater 19 is disposed proximate the tube 12 to supply heat for curing of the resin binder.

With the constituents disposed as described above, tension is applied to the tube 16 through the clamps 18 in the directions indicated by the arrows in FIG. 1, thereby stretching the tube to decrease the diameter thereof and applying radial compression on the bundle 10. In this connection, the sectional dimensions of the tube should be such that, as determined by the diameter of the bundle 10, the diameter of the tube is reduced by tension thereon to a degree suitable to impose the required compression on the bundle. As dictated by the composition of the resin 14, heat is simultaneously applied to the bundle 10 by the heater 19 for a sufficient period of time to partially or fully cure the resin as desired.

For room temperature curing, Epon 828, a condensation product of epichlorohydrin and bisphenol with a curing agent, had been found to be suitable as a binder. Other resins having properties similar to Epon 828 can, of course, be used with equal results. Such alternative resins are available in catalogues such as "Modern Plastics Encyclopedia," 1967, published by McGraw-Hill Inc., particularly in the section thereof relating to epoxy resins on page 165.

As am alternative process, the curing of the resin 14 may be accomplished in stages by precuring or partially curing the resin until sufficient rigidity is obtained and then removing the tube 16 for final cure of the resin.

As an example, it has been found that, in the two-stage process, epoxy resins such a DEN 438, a trademark for an epoxy novolak resin (the novolaks comprise soluble phenol-formaldehyde resins obtained by the use of acid catalysts or of excess phenol), with the curing agent of "Nadic methyl anhydride" (trademark for the isomers of methylbicyclo-(2,2,1)-heptene-2,3-dicarboxylic anhydride), with an accelerator of benzyl dimethyl amine have particular utility. The bundle 10 is cured for 2 hours at 200° F. in the tube 16 and then removed therefrom for post curing at 300° F. for 4 hours.

In addition to solid elongated articles, cored or tubular members can also be fabricated. Referring now to FIG. 3 of the drawings, a variation of a process in accordance with the invention for forming such shapes is illustrated. In this variation, the fibers 12 are bundled around a centrally disposed core 20 and disposed in the tube 16. The constituents then are compressed and cured essentially as described for the embodiment of FIGS. 1 and 2. If the resultant article is to have a core, the core 20 is retained. If the resultant article is to be a hollow tube, the core 20 can be a removable mandrel, for example, formed of a fusible alloy which, after formation of the article, is melted out. It should be understood that the core 20 may also be disposed eccentrically to produce nonconcentric tubes, or in the surface of the bundle of fibers 12 to fabricate channel shapes, if so desired.

The aforedescribed processes of forming elongated articles may be carried one step further for the further formation of those articles into complex structures. Referring to FIG. 4 of the drawings, the further step is illustrated. After partial curing or precuring of the resin to provide solidification thereof, the tube and bundle are deformed by deforming the tube 16, followed by final curing of the resin. In the figure the bundle containing tube 16 is illustrated conformed to form 22, under tension. The further step may also be accomplished without application of tension of the resin is sufficiently solidified by the partial cure thereof.

As a specific example of a process in accordance with the latter described variation of the invention, filaments and resin, disposed in the tube 16 as described above, can be precured at temperatures ranging from ambient temperature to 200° F. for 2 to 4 hours depending upon the resin system used as the binder. The tube and bundle is then deformed into the final configuration and final curing is accomplished, after which the tube 16 is removed.

It should be evident that many kinds of articles may be produced in accordance with this invention. For example, cylindrical rods produced by the process of FIGS. 1 and 2 may be used for compression test samples, shafts for sporting goods such as golf clubs, arrows or the like. Articles fabricated in accordance with the process of FIG. 3 including tubing, piping and channel or noncylindrical or hollow tubular articles. With the process of FIG. 4, various complex solid or hollow structural elements may be formed from the basic rod, tube or channel shapes.

What has been set forth above is intended primarily as exemplary of teachings in accordance with the invention to enable those skilled in the art in the practice thereof. It should therefore be understood that, within the scope of the appended claims, the invention may be practiced other than as specifically described.

What is new and therefore desired to be protected by Letters Patent of the United States is:

1. A method of fabricating fiber reinforced articles comprising the steps of:
    encapsulating a resin impregnated bundle of elongated fibers in a resilient tube, having a circular cross section and a length greater than the length of the impregnated bundle of fibers to provide unfilled tubular ends;
    at least partially curing the resin while applying from the unfilled ends of the resilient tube longitudinal tension generally along the axis of said tube to elongate said tube which applies radial compression for consolidation of the fibers in said bundle;
    at least partially curing the resin to consolidate the fibers therein;
    and removing said tube from said bundle.

2. A method in accordance with claim 1 wherein after said resin is partially cured, said tube and bundle are then deformed transversely of the axis thereof followed by full curing of said resin.

3. A method in accordance with claim 1 wherein, in formation of said bundle, said fibers are disposed to at least partially enclose a core.

4. A method in accordance with claim 3 wherein said core is composed of a fusible alloy material and wherein said core is melted from said bundle after curing thereof.

5. A method in accordance with claim 1 wherein, during formation of said bundle, said fibers are disposed to enclose a centrally located, longitudinally disposed core.

6. A method in accordance with claim 2 wherein, during formation of said bundle, said fibers are disposed to at least partially enclose a core.

7. A method in accordance with claim 6 wherein said core is composed of a fusible alloy material and wherein said core is melted from said bundle after full curing thereof.

8. A method of fabricating fiber reinforced articles comprising the steps of:
    encapsulating a resin impregnated bundle of elongated fibers in a resilient tube having a circular cross section and a length greater than the length of the impregnated bundle of fibers to provide unfilled tubular ends;
    clamping the unfilled ends of the resilient tube;
    at least partially curing the resin while applying longitudinal tension to said tube through the end clamps to elongate said tube which applies radial compression for consolidation of the fibers in said bundle;
    and removing said tube from said bundle.